United States Patent
Yaros

(10) Patent No.: US 8,755,612 B2
(45) Date of Patent: Jun. 17, 2014

(54) IDENTIFYING TRUNCATED CHARACTER STRINGS

(75) Inventor: Al Yaros, Hod-Hasharon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 402 days.

(21) Appl. No.: 13/327,393

(22) Filed: Dec. 15, 2011

(65) Prior Publication Data

US 2013/0156322 A1    Jun. 20, 2013

(51) Int. Cl.
*G06K 9/68* (2006.01)
(52) U.S. Cl.
USPC .......................................... 382/218; 715/762
(58) Field of Classification Search
USPC .......... 382/190, 195, 198, 218, 321; 715/762; 717/124–125; 704/4
See application file for complete search history.

(56) References Cited

U.S. PATENT DOCUMENTS

| | | | |
|---|---|---|---|
| 7,103,875 B1 | 9/2006 | Kaneko et al. | |
| 7,395,500 B2 * | 7/2008 | Whittle et al. | 715/243 |
| 8,160,865 B1 * | 4/2012 | Coughlan et al. | 704/4 |
| 8,448,142 B2 * | 5/2013 | Squillace | 717/125 |
| 2007/0250820 A1 | 10/2007 | Edwards et al. | |
| 2008/0141164 A1 * | 6/2008 | Jiang | 715/786 |
| 2010/0299559 A1 | 11/2010 | Randimbivololona | |
| 2013/0055117 A1 * | 2/2013 | Sahibzada et al. | 715/762 |
| 2014/0033097 A1 * | 1/2014 | Chiang et al. | 715/765 |

OTHER PUBLICATIONS

"Using Poka-Yoke Techniques for Early Defect Detection"; Robinson, H.; 1997.

* cited by examiner

*Primary Examiner* — Ishrat I Sherali

(57) ABSTRACT

A method includes automatically identifying a screen control in a user interface. Optical character recognition is applied to read a text that is displayed on an image of the screen control. The displayed text is automatically compared to a character string that is designated for the screen control. If part of the character string is not included in the displayed text, the displayed text is identified as truncated text.

20 Claims, 3 Drawing Sheets

IDENTIFYING TRUNCATED CHARACTER STRINGS

BACKGROUND

A graphical user interface may include various screen controls. A user of the interface may interact with the screen controls by controlling a pointing device such as, for example, a mouse, joystick, trackball, or keyboard arrow. A screen control may include, for example, a pushbutton, check box, radio button, edit box, or dropdown box.

In order to assist a user in operating a screen control, a screen control may be labeled with, or accompanied by, text. For example, the labeling text may be displayed on or next to the screen control. A pushbutton may be labeled with a text that indicates a function of the button. Similarly, other screen controls, such as check boxes, radio buttons, edit boxes, or dropdown boxes may be accompanied by an adjacent or neighboring text label, title, or explanatory text.

A developer of the graphical user interface may design the screen controls with their accompanying text. For example, the appearance and function of screen controls be defined by a computer program or software. The program may incorporate or refer to a control text table. The control text table may associate each screen control with a designated character string that defines text to accompanying that screen control.

During the course of development of the graphical user interface, the text that accompanies a screen control may be modified. For example, an editor, reviewer, or quality assurance specialist may modify the accompanying text, during or after initial development of the graphical user interface. Similarly, the graphical user interface may be adapted for use in a locality different from the locality wherein the graphical user interface was developed. The accompanying text may be translated to another language, or may be otherwise modified to reflect a local culture. Such adaptation of the graphical user interface to a locality may be referred to as "localization." When modifying the text that accompanies the screen control, and editor or translator may edit or modify the control text table.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

Figure 1:
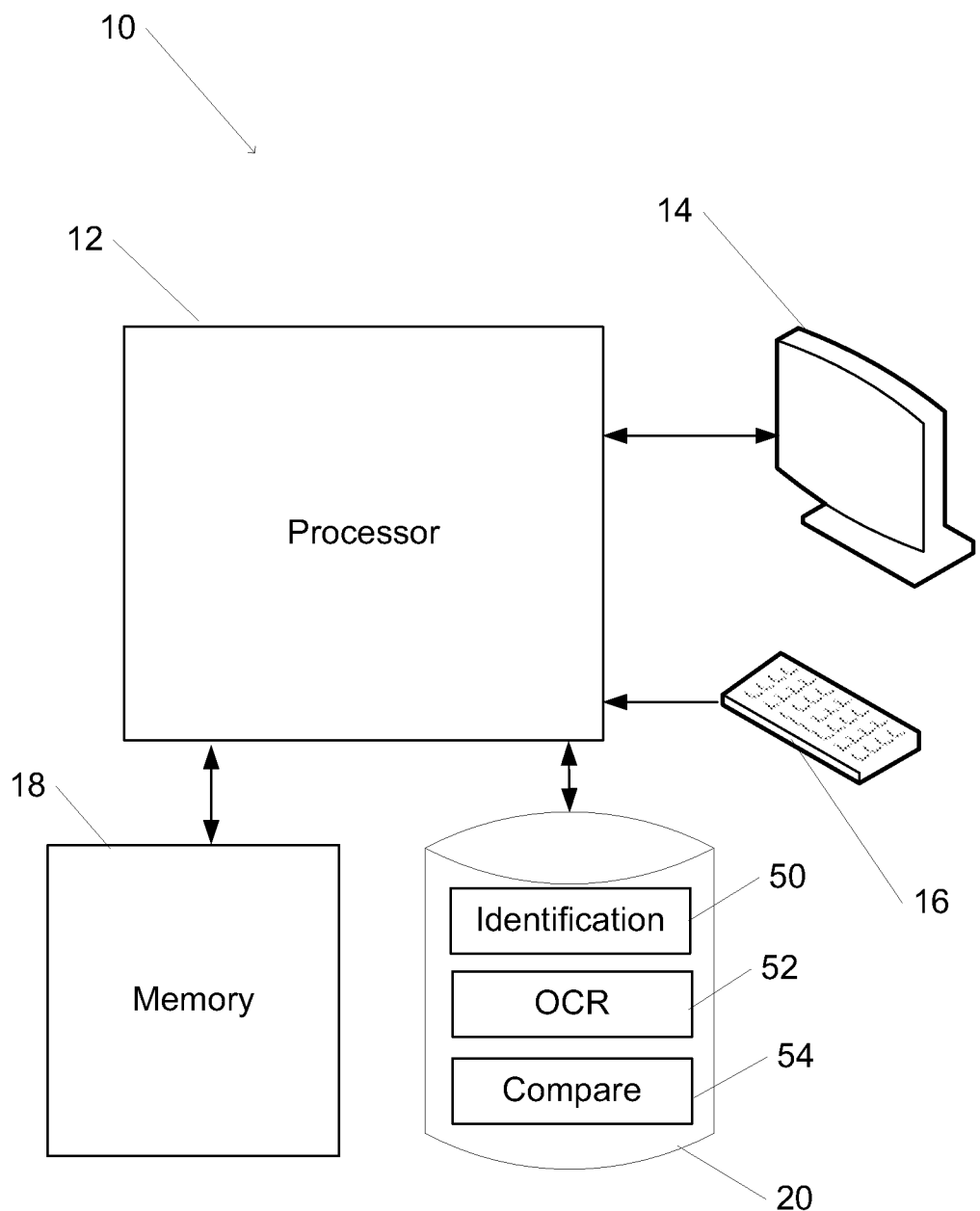
FIG. 1 is a schematic illustration of a system for application of an example of automatic detection of truncated character strings.

Software localization efforts can inadvertently lead to truncating a character string for a screen control of a graphical user interface. Such truncated text may be caused by the lengthening of a character string that is associated with a screen control without redesigning the screen control or its environment. For example, when adapting (localizing) a graphical user interface to a particular locality, text may be lengthened. A screen control of a graphical user interface may have been designed with regard to accompanying text in a particular language (the "design language"). In the design language, no text is truncated. The accompanying text may have then been adapted to a locality by a person who does not participate directly in design of, or may not be aware of, a layout of the associated screen control or graphical user interface.

The accompanying text may be adapted to local conditions by a translator or editor who is given a list of terms and asked to make them understandable to residents of the locality (e.g. in a local language of that locality). A translator may have translated a term in the design language into a term in the local language without having been aware of limits to an allowed number of characters or another space limitation. Thus, the translator may have substituted a long character string for a shorter character string that was originally designated to accompany a screen control. If the screen control is too small to accommodate the new longer character string, or if another nearby screen control limits the space available for the screen control (e.g. even if an application for designing a screen control automatically adapts a size of the screen control to its accompanying text), the text that accompanies the screen control may have been truncated.

As another example of lengthening accompanying text of a screen control, an editor may have substituted a full term for a previously abbreviated or contracted term, or a screen designer may have added a screen control to a graphical user interface without having noticed that accompanying text of an adjacent screen control is being covered or truncated.

Various examples described below operate to identify truncated character strings that accompany screen controls of a user interface. Optical character recognition (OCR) is applied to a region of the displayed user interface that is automatically identified as a screen control. The identified text is automatically compared with a character string that defines text that is designated to accompany (e.g. displayed on or adjacent to the screen control. For example, a character string that is designated to accompany the identified screen control may be read from an entry in a control text table that corresponds to the identified screen control. If part of the designated character screen is not included in the identified text, then the text as displayed in the identified screen control may be determined to be cut off or truncated. An appropriate alert may then be issued.

For example, a user (e.g. a person performing a quality assurance review of a graphical user interface design) may execute an application for automatic identification of truncated character strings and apply it to a user interface that is displayed on a screen. Upon detection of truncated text, the application may display the identified text and the designated character string, with an indication that the text may be truncated. The identified text can then be examined to determine whether the identified text is acceptable (e.g. not truncated or understandable despite truncation). If deemed necessary, the designated character string or the screen control may then be modified so as to eliminate the truncation or otherwise correct the mismatch between the designated character string and the identified text.

A system may be configured to detect truncated character strings in a graphical user interface. In the example of FIG. 1, such a system is shown. Automatic truncated text detection system 10 includes a processor 12. For example, processor 12 may include one or more processing units, e.g. of one or more computers. Processor 12 may be configured to operate in accordance with programmed instructions stored in memory 18. Processor 12 may be capable of executing an application for automatic detection of screen controls, or an application for automatic detection of truncated character strings.

Processor 12 may communicate with output device 14. For example, output device 14 may include a computer monitor or screen. Processor 12 may communicate with a screen of output device 14 to display a graphical user interface, or to display a result of execution of an application for automatic detection of truncated character strings. In another example, output device 14 may include a printer, display panel, speaker, or another device capable of producing visible, audible, or tactile output.

Processor 12 may communicate with input device 16. For example, input device 16 may include one or more of a keyboard, keypad, or pointing device for enabling a user to inputting data or instructions for operation of processor 12.

Processor 12 may communicate with memory 18. Memory 18 may include one or more volatile or nonvolatile memory devices. Memory 18 may be utilized to store, for example, programmed instructions for operation of processor 12, data or parameters for use by processor 12 during operation, or results of operation of processor 12

Processor 12 may communicate with data storage device 20. Data storage device 20 may include one or more fixed or removable nonvolatile data storage devices. For example, data storage device 20 may include a computer readable medium for storing program instructions for operation of processor 12. In this example, the programmed instructions may take the form of identification module 50 for automatic identification of screen controls, OCR module 52 for automatically recognizing or identifying text on a screen control, and compare module 54 for comparing an identified text with a character string that is designated for a screen control so as to identify truncated text. It is noted that storage device 20 may be remote from processor 12. In such cases storage device 20 may be a storage device of a remote server storing modules 50-54 in the form of an installation package or packages that can be downloaded and installed for execution by processor 12. Data storage device 20 may be utilized to store data or parameters for use by processor 12 during operation, or results of operation of processor 12.

Figures 2A, 2B:
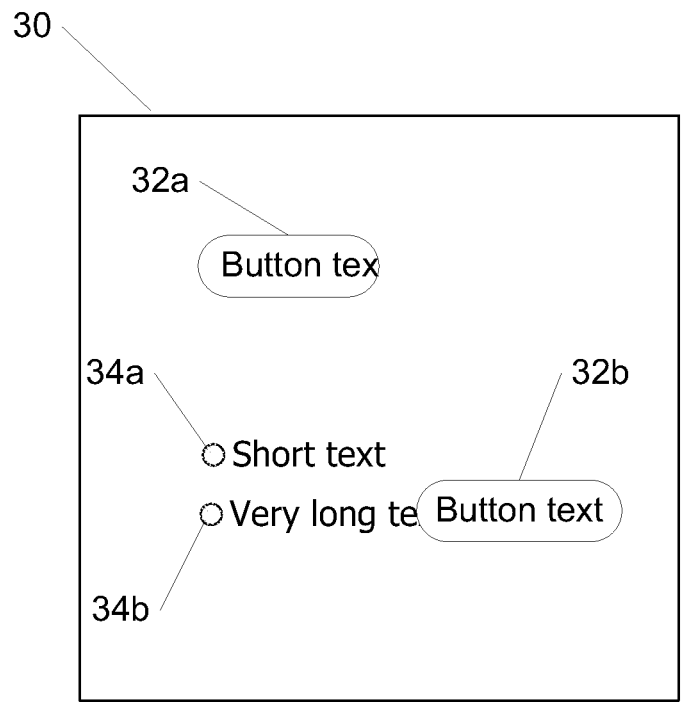
FIG. 2A schematically shows a graphical user interface on which an example of automatic detection of truncated character strings may be applied.
FIG. 2B schematically shows a control text table for the graphical user interface shown in FIG. 2A.

In operation, processor 12 may execute a method for automatic detection of truncated character strings on a graphical user interface. That graphical user interface may be displayable on a screen of output device 14. FIG. 2A schematically shows a graphical user interface 30 on which an example of automatic detection of truncated character strings may be applied. FIG. 2B schematically shows a control text table 40 for the graphical user interface 30 shown in FIG. 2A.

In the example of FIG. 2A, graphical user interface 30 may be displayable, e.g. on a screen of output device 14 (FIG. 1). Graphical user interface 30 includes screen controls. Examples of screen controls are shown in the form of pushbutton 32a (with label text "Button tex"), pushbutton 32b (with label text "Button text"), radio button 34a (accompanied by text "Short text"), and radio button 34b (accompanied by text "Very long te").

Control text table 40 in FIG. 2B includes a row corresponding to each screen control of graphical user interface 30. In each row of control text table 40, column 42 includes a label of each screen control (corresponding to the labels of screen controls in FIG. 2A). Column 44 includes a character string that indicates a designated character string corresponding to each screen control listed in column 42. For example, the designated character string for pushbutton 32a is "Button text", for pushbutton 32b is again "Button text", for radio button 34a is "Short text", and for radio button 34b is "Very long text." An application for generating or displaying graphical user interface 30 may display, or display in truncated form, the designated character string of column 44 in association with the corresponding screen control listed in column 42.

Column 46 indicates a description of each screen control listed in column 42 (each represented by "Descr" followed by the label of the corresponding screen control in FIG. 2A). For example, a description may include a designation of the type of control (e.g. pushbutton, radio button, check box, edit box, dropdown box), and a set of coordinates or other specifiers that specify a location (and size) of the corresponding screen control within graphical user interface 30. Control text table 40 may include additional information with regard to each listed screen control. Although control text table 40 is shown for illustrative purposes in tabular form, other forms (e.g. a linked list or data structure) are possible.

Comparison of screen controls of graphical user interface 30 with entries in control text table 40 indicate that text in some of the screen controls has been truncated. For example, a horizontal width of pushbutton 32a of graphical user interface 30 is shown as too small to accommodate the entire designated character string "Button text." Thus, the truncated text "Button tex" labels pushbutton 32a instead. Similarly, pushbutton 32b is placed so close to radio button 34b so as to restrict the available space for displaying the designated character string "Very long text." Thus, radio button 34b is accompanied by the truncated text "Very long te".

Application of an example of a method for automatic detection of truncated character strings may assist a user in detecting truncated text that accompanies a screen control. Automatic detection of truncated character strings may be advantageous (e.g. faster, more efficient, or less tedious) over manual examination of a graphical user interface for truncated strings. A manual examination could include a control-by-control comparison of displayed text versus a designated character string. Such a manual examination could be assisted by an environment, application, or tool that enables viewing a designated character string alongside a selected screen control. However, in the case that a user is unfamiliar with a local language to which the graphical user interface had been adapted, manual examination, even assisted manual examination could be difficult, inefficient, or inaccurate.

Figure 3:
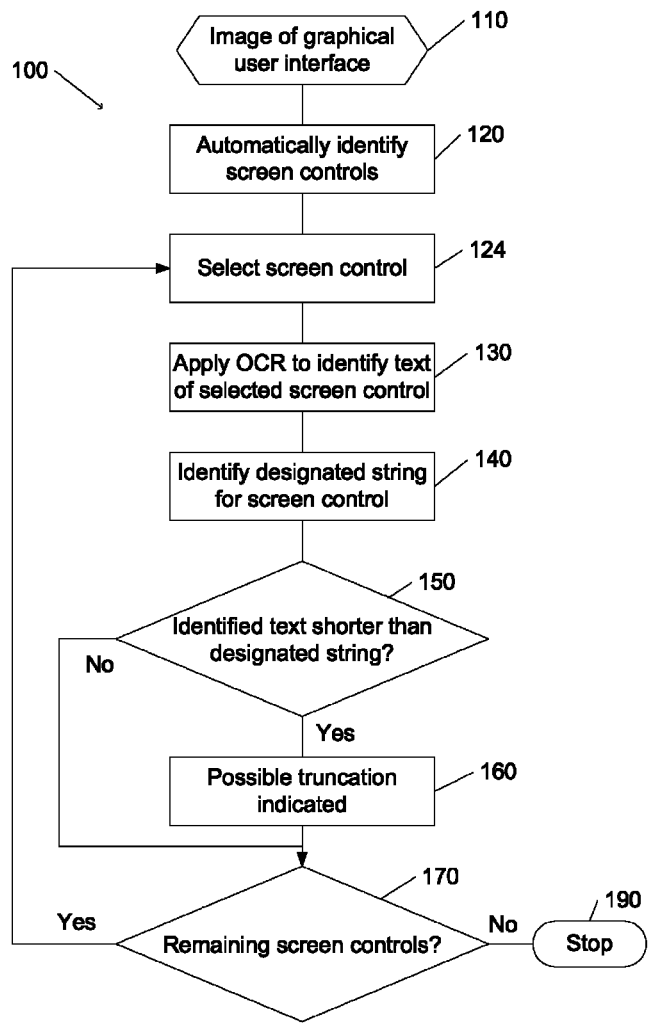
FIG. 3 is a flowchart of an example of a method for automatic detection of truncated character strings.

FIG. 3 is a flowchart depicting a method for automatic detection of truncated character strings. In discussing FIG. 3, reference is made also to the examples illustrated in FIGS. 2A and 2B. In the Example of FIG. 3, automatic truncated character string detection method 100 may be executed by a processor of a system for automatic detection of truncated character strings. Automatic truncated character string detection method 100 may be executed upon a request or command that is issued by a user, or automatically issued by another application.

For example, an automatic software testing application may generate or display a graphical user interface. The automatic software testing application may then apply automatic truncated character string detection method 100 to the generated interface. In another example, a localization application may be configured to adapt a graphical user interface to a locality. The localization application may apply automatic (machine) text translation to the designated character strings of column 44 of control text table 40. The localization application may then apply automatic truncated character string detection method 100 to the resulting graphical user interface.

Thus, automatic truncated character string detection method 100 may be executed upon acquisition of an image of a graphical user interface, such as graphical user interface 30 (block 110). In one example, an image of a graphical user interface may be acquired as a screen shot or screen capture of a displayable or displayed graphical user interface. The graphical user interface may be generated or displayed by a processor that is executing automatic truncated character string detection method 100. In another example, an imaging device may acquire an image of a displayed graphical user interface.

Screen controls are automatically identified (block 120). Referring to FIG. 2B, the operation depicted in block 120 may be accomplished by interpreting control text table 40 or other computer interpretable instructions for defining screen controls of the graphical user interface. Thus, coordinates or a location of each screen control may be identified. In an example, screen controls such as pushbuttons 32*a* and 32*b* and radio buttons 34*a* and 34*b* of graphical user interface 30 may be automatically identified, e.g. by reference to their appropriate entries in control text table 40 (e.g. the descriptions in column 46 of control text table 40). In another example, the operation depicted in block 120 may be accomplished by parsing an acquired image of a graphical user interface into components that correspond to screen controls.

One of the identified screen controls may be selected (block 124). For example, each of the identified controls may be selected sequentially. The sequence may be determined, for example, by consideration of such factors as placement of each control within the graphical user interface, by an identified type of control, or in accordance with another criterion.

A text identification technique, or OCR, is applied to the selected screen control (block 130). For example, OCR may be applied to a region of the graphical user interface as determined by coordinates of the selected screen control. Application of OCR may capture, interpret, and return a displayed text that accompanies the selected screen control. For example, the OCR, a screen control identification application, or automatic truncated character string detection method 100 may be provided with a instructions regarding recognizing a location (e.g. relative to the screen control) of text that accompanies each type of identified screen control.

A character string that is designated for the selected screen control is identified (block 140). For example, a designated character string may be obtained from column 44 in the row of control text table 40 that corresponds to the selected screen control. If the selected screen control had been identified from analysis (e.g. parsing) of an image of graphical user interface 30, a location (and type) of the selected screen control may be matched to a screen control description in column 46 of a row of control text table 40. The designated character screen may be obtained from the row in column 44 of the matching row.

The identified designated character string may then be compared with the displayed text of the selected screen control (block 150) that was identified via application of OCR (in the operation of block 130). For example, each character of the identified displayed text may be compared sequentially with each character of the designated character string. As another example, a count of characters in the identified displayed text may be compared with a count of characters in the designated character string.

In some cases, the identified displayed text may be shorter than the identified designated character string. For example, the identified displayed text may be missing a character that is present in the designated character string. The number of characters in the identified displayed text may be less than the number of characters in the designated character string. In such cases, a possible truncation of the identified displayed text may be indicated (block 160).

When a possible truncation is indicated, a notification or alert may be issued. For example, a user interface associated with automatic truncated character string detection method 100 may display the possibly truncated text or the original designated character string. The user interface may enable corrective action, or may issue a report for forwarding to personnel who are responsible for taking corrective action. As another example, the selected screen control may be highlighted or otherwise indicated on an image of the graphical user interface being tested (e.g. graphical user interface 30). A generated audible signal may accompany a displayed notification of possible truncation. A user may select to ignore or cancel the notification, e.g. if the user determines that utility of the graphical user interface being tested is not affected.

Whether or not a possible truncation is indicated, if more of the identified screen controls remain to be selected (block 170), another of the screen controls may be selected (returning to block 124). The process of identifying and comparing text and designated character strings (blocks 130 through 160) may be repeated for each selected screen control. If no more of the identified screen controls remain to be selected, execution of automatic truncated character string detection method 100 may end (block 190). At this point a report of results of application of automatic truncated character string detection method 100 to the graphical user interface being tested may be generated or returned.

It should be understood with respect to the flowchart that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other examples of the illustrated method.

Similarly, it should be understood that, unless indicated otherwise, the illustrated order of execution of the operations represented by blocks of the flowchart has been selected for convenience and clarity only. Operations of the illustrated method may be executed in an alternative order, or concurrently, with equivalent results. Such reordering of operations of the illustrated method should be understood as representing other examples of the illustrated method.

In accordance with an example of automatic identification of truncated strings, a computer program application stored in a computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for automatic identification of truncated strings. The computer-readable medium may be a non-transitory computer-readable media including all forms and types of computer-readable media except for a transitory, propagating signal.

I claim:

1. A method comprising:
   automatically identifying a screen control in a user interface;
   applying optical character recognition to read a text that is displayed on the screen control in an image of the user interface;
   automatically comparing the displayed text to a character string that is designated for the screen control; and if part of the character string is not included in the displayed text, identifying the displayed text as truncated text.

2. The method of claim 1, wherein automatically identifying the screen control comprises examining computer interpretable instructions that define the screen control.

3. The method of claim 1, wherein automatically identifying the screen control comprises application of a parsing technique to the image of the user interface.

4. The method of claim 1, wherein automatically identifying the screen control comprises sequentially selecting each screen control from a plurality of identified screen controls.

5. The method of claim 1, wherein automatically comparing the displayed text comprises retrieving the designated character string from a table of screen controls and their associated designated character strings.

6. The method of claim 5, wherein automatically identifying the screen control comprises identifying a location of the screen control, wherein the retrieving the designated character string comprises retrieving a designated character string that corresponds to the identified location.

7. The method of claim 1, wherein the image comprises an image of a localized graphical user interface.

8. The method of claim 1, further comprising generating a notification when the displayed text is identified as truncated text.

9. A non-transitory computer readable medium having stored thereon instructions that when executed by a processor will cause the processor to perform the method of:
    obtaining an image of a user interface;
    identifying a screen control in the user interface;
    applying optical character recognition to read a text that is displayed on the screen control in the image;
    comparing the displayed text to a character string that is designated for the screen control; and
    if part of the character string is not included in the displayed text, identifying the displayed text as truncated text.

10. The non-transitory computer readable medium of claim 9, wherein automatically identifying the screen control comprises examining computer interpretable instructions that define the screen control.

11. The non-transitory computer readable medium of claim 9, wherein automatically identifying the screen control comprises application of a parsing technique to the image of the user interface.

12. The non-transitory computer readable medium of claim 9, wherein automatically identifying the screen control comprises sequentially selecting each screen control from a plurality of identified screen controls.

13. The non-transitory computer readable medium of claim 9, wherein automatically comparing the displayed text comprises retrieving the designated character string from a table of screen controls and their associated designated character strings.

14. The non-transitory computer readable medium of claim 13, wherein automatically identifying the screen control comprises identifying a location of the screen control, wherein the retrieving the designated character string comprises retrieving a designated character string that corresponds to the identified location.

15. The non-transitory computer readable medium of claim 9, wherein the image comprises an image of a localized graphical user interface.

16. The non-transitory computer readable medium of claim 9, wherein the method further comprises generating a notification when the displayed text is identified as truncated text.

17. A system comprising:
    a processing unit in communication with a computer readable medium, wherein the computer readable medium contains a set of instructions wherein the processing unit is designed to carry out the set of instructions to:
    obtain an image of a user interface;
    identify a plurality of screen controls in the user interface;
    for each of the screen controls, read a text that is displayed on an image of that screen control;
    compare the displayed text to a character string that is designated for that screen control; and
    if part of the character string is not included in the displayed text, issue a notification that identifies the displayed text as truncated text.

18. The system of claim 17, wherein the set of instructions include instructions to examine computer interpretable instructions that define the screen control.

19. The system of claim 17, comprising a stored table of screen controls and their associated designated character strings.

20. The system of claim 19, wherein a designated character string is identifiable in the table by a coordinate of its corresponding screen control.

* * * * *